(12) United States Patent
Dziczkowski et al.

(10) Patent No.: US 9,988,553 B2
(45) Date of Patent: Jun. 5, 2018

(54) THERMOSETTING COATING COMPOSITIONS

(71) Applicant: Eastman Chemical Company, Kingsport, TN (US)

(72) Inventors: Jamie Sue Dziczkowski, Kingsport, TN (US); Kenneth Douglas Chaffin, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days. days.

(21) Appl. No.: 15/435,353

(22) Filed: Feb. 17, 2017

(65) Prior Publication Data

US 2017/0240768 A1 Aug. 24, 2017

Related U.S. Application Data

(60) Provisional application No. 62/298,109, filed on Feb. 22, 2016.

(51) Int. Cl.
| | | |
|---|---|---|
| *C09D 167/02* | (2006.01) | |
| *C09D 5/02* | (2006.01) | |
| *C08L 67/02* | (2006.01) | |
| *C08K 5/06* | (2006.01) | |

(52) U.S. Cl.
CPC ........... *C09D 167/02* (2013.01); *C09D 5/022* (2013.01); *C08K 5/06* (2013.01); *C08L 67/02* (2013.01); *C08L 2312/04* (2013.01); *C08L 2666/34* (2013.01)

(58) Field of Classification Search
None
See application file for complete search history.

(56) References Cited

U.S. PATENT DOCUMENTS

| | | |
|---|---|---|
| 2,891,930 A | 6/1959 | Caldwell et al. |
| 3,018,272 A | 1/1962 | Griffing et al. |
| 3,033,822 A | 5/1962 | Kibler et al. |
| 3,075,952 A | 1/1963 | Coover, Jr. et al. |
| 3,108,083 A | 10/1963 | Laganis |
| 3,216,884 A | 11/1965 | O'Donnell |
| 3,227,764 A | 1/1966 | Martin et al. |
| 3,312,645 A | 4/1967 | George et al. |
| 3,313,777 A | 4/1967 | Elam et al. |
| 3,345,313 A | 10/1967 | Ruhf et al. |
| 3,484,339 A | 12/1969 | Caldwell |
| 3,502,620 A | 3/1970 | Caldwell |
| 3,528,947 A | 9/1970 | Lappin et al. |
| 3,538,187 A | 11/1970 | Feltzen |
| 3,734,874 A | 5/1973 | Kibler et al. |
| 3,772,227 A | 11/1973 | Kapalko et al. |
| 3,779,993 A | 12/1973 | Kibler et al. |
| 3,789,044 A | 1/1974 | Taft et al. |
| 3,800,004 A | 3/1974 | Sherwood et al. |
| 3,856,830 A | 12/1974 | Kuehn |
| 4,054,681 A | 10/1977 | Brüning et al. |
| 4,074,061 A | 2/1978 | Musser |
| 4,076,766 A | 2/1978 | Simms |
| 4,119,680 A | 10/1978 | Vachon |
| 4,120,847 A | 10/1978 | Culbertson |
| 4,196,109 A | 4/1980 | Laganis et al. |
| 4,264,671 A | 4/1981 | Gillern et al. |
| 4,267,279 A | 5/1981 | Howell |
| 4,299,933 A | 11/1981 | McConnell et al. |
| 4,304,901 A | 12/1981 | O'Neill et al. |
| 4,322,508 A | 3/1982 | Peng et al. |
| 4,338,379 A | 7/1982 | Strolle et al. |
| 4,350,807 A | 9/1982 | McConnell et al. |
| 4,363,908 A | 12/1982 | Joyner et al. |
| 4,397,989 A | 8/1983 | Adesko |
| 4,433,119 A | 2/1984 | Brode et al. |
| 4,480,077 A | 10/1984 | Hefner, Jr. |
| 4,525,504 A | 6/1985 | Morris et al. |
| 4,525,544 A | 6/1985 | Nelson et al. |
| 4,581,093 A | 4/1986 | Noyes et al. |
| 4,585,854 A | 4/1986 | Tung et al. |
| 4,698,391 A | 10/1987 | Yacobucci et al. |
| 4,716,200 A | 12/1987 | Berghoff |
| 4,724,173 A | 2/1988 | Rocket et al. |
| 4,737,551 A | 4/1988 | Deivan et al. |
| 4,751,267 A | 6/1988 | Berghoff |
| 4,771,101 A | 9/1988 | Pruett et al. |
| 4,859,760 A | 8/1989 | Light, Jr. et al. |

(Continued)

FOREIGN PATENT DOCUMENTS

| | | |
|---|---|---|
| BE | 615850 | 7/1962 |
| CA | 740050 A | 8/1966 |
| CA | 2 111 927 A1 | 6/1994 |
| EP | 1 273 626 A1 | 1/2003 |
| EP | 1 647 564 | 4/2006 |
| EP | 2365036 A1 | 9/2011 |
| GB | 1 044 015 | 9/1966 |
| GB | 1 115 189 A | 5/1968 |
| GB | 1 130 558 | 10/1968 |
| GB | 2 025 998 B | 10/1982 |

(Continued)

OTHER PUBLICATIONS

Non-Final Office Action dated Apr. 21, 2017 received in co-pending U.S. Appl. No. 14/865,112.
Non-Final Office Action dated Jul. 11, 2017 received in co-pending U.S. Appl. No. 15/078,537.
International Search Report and Written Opinion for PCT/US2017/022885 dated May 25, 2017.
Co-pending U.S. Appl. No. 15/701,965, filed Sep. 12, 2017, Inglefield et al.
Final Office Action dated Oct. 12, 2017 received in co-pending U.S. Appl. No. 14/716,027.

(Continued)

*Primary Examiner* — Richard A Huhn
(74) *Attorney, Agent, or Firm* — Matthew W. Smith

(57) ABSTRACT

The present invention provides emulsions comprising curable polyesters and certain surfactants. The emulsions are useful as coatings binders in waterborne thermosetting coating compositions and can be used in conjunction with cross-linking compounds reactive with curable polyesters. Also provided are shaped or formed articles coated with the waterborne thermosetting coating compositions of the invention.

19 Claims, No Drawings

(56) References Cited

U.S. PATENT DOCUMENTS

| | | |
|---|---|---|
| 4,910,292 A | 3/1990 | Blount |
| 4,939,233 A | 7/1990 | Jenkins et al. |
| 4,959,259 A | 9/1990 | Guilbaud |
| 5,017,679 A | 5/1991 | Chang et al. |
| 5,023,367 A | 6/1991 | Calbo, Jr. et al. |
| 5,025,086 A | 6/1991 | Blount, Jr. et al. |
| 5,097,006 A | 3/1992 | Kapilow et al. |
| 5,124,388 A | 6/1992 | Pruett et al. |
| 5,160,792 A | 11/1992 | Barbee et al. |
| 5,218,042 A | 6/1993 | Kuo et al. |
| 5,245,002 A | 9/1993 | Kuo |
| 5,254,637 A | 10/1993 | Witzeman et al. |
| 5,256,759 A | 10/1993 | Kuo |
| 5,256,761 A | 10/1993 | Blount, Jr. |
| 5,288,820 A | 2/1994 | Rector, Jr. et al. |
| 5,290,631 A | 3/1994 | Fleury et al. |
| 5,306,567 A | 4/1994 | Kuo et al. |
| 5,321,118 A | 6/1994 | Hubbs et al. |
| 5,326,820 A | 7/1994 | Hoffmann et al. |
| 5,344,872 A | 9/1994 | Debord et al. |
| 5,349,026 A | 9/1994 | Emmons et al. |
| 5,369,210 A | 11/1994 | George et al. |
| 5,371,148 A | 12/1994 | Taylor et al. |
| 5,393,609 A | 2/1995 | Chang et al. |
| 5,393,840 A | 2/1995 | Kuo |
| 5,393,849 A | 2/1995 | Srinivasan et al. |
| 5,397,641 A | 3/1995 | Moens et al. |
| 5,416,187 A | 5/1995 | Kuo et al. |
| 5,439,988 A | 8/1995 | Moens et al. |
| 5,453,464 A | 9/1995 | Witzeman et al. |
| 5,464,909 A | 11/1995 | Chang et al. |
| 5,498,668 A | 3/1996 | Scott |
| 5,541,268 A | 7/1996 | Fenn et al. |
| 5,554,701 A | 9/1996 | Chang et al. |
| 5,596,037 A | 1/1997 | Moens et al. |
| 5,596,049 A | 1/1997 | Gallucci et al. |
| 5,646,237 A | 7/1997 | George et al. |
| 5,654,347 A | 8/1997 | Khemani et al. |
| 5,663,266 A | 9/1997 | Taylor et al. |
| 5,696,176 A | 12/1997 | Khemani et al. |
| 5,852,120 A | 12/1998 | Bederke |
| 5,919,873 A | 7/1999 | Irving |
| 5,932,641 A | 8/1999 | Blanchard et al. |
| 5,955,565 A | 9/1999 | Morris et al. |
| 5,993,975 A | 11/1999 | Tanaka et al. |
| 6,087,464 A | 7/2000 | Swarup et al. |
| 6,120,851 A | 9/2000 | Borgholte et al. |
| 6,184,311 B1 | 2/2001 | O'Keeffe et al. |
| 6,211,309 B1 | 4/2001 | McIntosh et al. |
| 6,248,843 B1 | 6/2001 | Panandiker et al. |
| 6,255,366 B1 | 7/2001 | Adams et al. |
| 6,265,072 B1 | 7/2001 | Fagerburg |
| 6,423,816 B1 | 7/2002 | Wamprecht et al. |
| 6,444,781 B1 | 9/2002 | Kuo et al. |
| 6,780,523 B2 | 8/2004 | Kuo et al. |
| 6,841,604 B2 | 1/2005 | Bayer et al. |
| 6,887,937 B1 | 5/2005 | Vandevoorde et al. |
| 6,992,133 B2 | 1/2006 | Yokoyama et al. |
| 6,995,194 B2 | 2/2006 | Moens et al. |
| 7,087,672 B2 | 8/2006 | Yuan et al. |
| 7,141,625 B2 | 11/2006 | Komazaki et al. |
| 8,163,850 B2 | 4/2012 | Marsh et al. |
| 8,168,721 B2 | 5/2012 | Marsh et al. |
| 8,324,316 B2 | 12/2012 | Powell et al. |
| 8,449,960 B2 | 5/2013 | Skillman et al. |
| 8,492,465 B2 | 7/2013 | Seibold et al. |
| 8,519,055 B2 | 8/2013 | Marsh et al. |
| 8,524,834 B2 | 9/2013 | Marsh et al. |
| 8,580,872 B2 | 11/2013 | Kuo et al. |
| 8,663,765 B2 | 3/2014 | Skillman et al. |
| 9,029,460 B2 | 5/2015 | Marsh et al. |
| 9,029,461 B2 | 5/2015 | Marsh et al. |
| 9,034,964 B2 | 5/2015 | Kuo et al. |
| 9,090,741 B2 | 7/2015 | Morschhaeuser et al. |
| 9,096,772 B2 | 8/2015 | Lespinasse et al. |
| 9,200,177 B2 | 12/2015 | Young et al. |
| 9,487,619 B2 | 11/2016 | Kuo et al. |
| 9,598,602 B2 | 3/2017 | Kuo et al. |
| 2001/0051706 A1 | 12/2001 | George et al. |
| 2002/0086154 A1 | 7/2002 | Miller et al. |
| 2002/0103329 A1 | 8/2002 | Koldijk et al. |
| 2003/0083425 A1 | 5/2003 | Morimoto et al. |
| 2003/0105214 A1* | 6/2003 | Bayer .......... C08G 63/85 524/495 |
| 2003/0113462 A1 | 6/2003 | Hirose et al. |
| 2003/0205852 A1 | 11/2003 | Porter |
| 2004/0024140 A1 | 2/2004 | Fujita et al. |
| 2004/0087736 A1 | 5/2004 | Wu et al. |
| 2005/0176859 A1 | 8/2005 | Tinkl et al. |
| 2006/0079650 A1 | 4/2006 | Stevenson et al. |
| 2006/0286383 A1 | 12/2006 | Gilmer |
| 2007/0020557 A1 | 1/2007 | Yao et al. |
| 2007/0092746 A1 | 4/2007 | Wayton et al. |
| 2007/0232778 A1 | 10/2007 | Moody et al. |
| 2007/0276065 A1 | 11/2007 | Barton et al. |
| 2008/0092776 A1 | 4/2008 | Stock et al. |
| 2008/0135060 A1 | 6/2008 | Kuo et al. |
| 2008/0139687 A1 | 6/2008 | Woods et al. |
| 2009/0047524 A1 | 2/2009 | Yaoi et al. |
| 2009/0076202 A1* | 3/2009 | Seibold .......... C08K 5/06 524/156 |
| 2009/0110843 A1 | 4/2009 | Halahmi et al. |
| 2010/0159176 A1 | 6/2010 | Hale et al. |
| 2010/0204363 A1 | 8/2010 | Marsh et al. |
| 2010/0204388 A1 | 8/2010 | Marsh et al. |
| 2010/0204392 A1 | 8/2010 | Marsh et al. |
| 2010/0204401 A1 | 8/2010 | Marsh et al. |
| 2010/0204413 A1 | 8/2010 | Powell et al. |
| 2010/0297422 A1 | 11/2010 | Lucas |
| 2011/0232002 A1 | 9/2011 | Wiessner |
| 2011/0315591 A1 | 12/2011 | Lespinasse et al. |
| 2012/0101187 A1 | 4/2012 | Kuo et al. |
| 2012/0172520 A1 | 7/2012 | Marsh et al. |
| 2012/0202920 A1 | 8/2012 | Marsh et al. |
| 2012/0264669 A1 | 10/2012 | Cristobal et al. |
| 2013/0023604 A1 | 1/2013 | Kuo et al. |
| 2013/0072628 A1 | 3/2013 | Crawford et al. |
| 2013/0296470 A1 | 11/2013 | Marsh et al. |
| 2013/0296488 A1 | 11/2013 | Marsh et al. |
| 2013/0324640 A1 | 12/2013 | Parish |
| 2014/0018496 A1 | 1/2014 | Kuo et al. |
| 2014/0128265 A1* | 5/2014 | Wacker .......... A01N 25/04 504/195 |
| 2014/0256852 A1 | 9/2014 | Vandezande et al. |
| 2014/0296406 A1 | 10/2014 | Marsh et al. |
| 2014/0296407 A1 | 10/2014 | Marsh et al. |
| 2014/0303283 A1 | 10/2014 | Ding et al. |
| 2014/0303303 A1 | 10/2014 | Benson |
| 2014/0342096 A1* | 11/2014 | Hsu .......... C09D 4/00 427/458 |
| 2014/0348776 A1 | 11/2014 | Palmer, Jr. et al. |
| 2015/0034522 A1 | 2/2015 | Itou et al. |
| 2015/0099827 A1 | 4/2015 | Hagiwara et al. |
| 2015/0099837 A1 | 4/2015 | Argyropoulos et al. |
| 2016/0115274 A1 | 4/2016 | Kuo et al. |
| 2016/0115345 A1 | 4/2016 | Kuo et al. |
| 2016/0115347 A1 | 4/2016 | Kuo et al. |
| 2016/0115348 A1 | 4/2016 | Kuo et al. |
| 2016/0280956 A1 | 9/2016 | Kuo et al. |
| 2016/0340471 A1 | 11/2016 | Zhou et al. |

FOREIGN PATENT DOCUMENTS

| | | |
|---|---|---|
| JP | 03-038281 | 2/1991 |
| JP | 08-073781 | 3/1996 |
| JP | 09-003341 | 1/1997 |
| JP | 2002-235038 | 8/2002 |
| JP | 2004-339493 A | 12/2004 |
| JP | 2006-233068 | 9/2006 |
| WO | WO 93/04125 | 3/1993 |
| WO | WO 94/01506 | 1/1994 |
| WO | WO 94/12557 | 6/1994 |
| WO | WO 95/01407 | 1/1995 |

(56) References Cited

FOREIGN PATENT DOCUMENTS

| WO | WO 96/33229 | 10/1996 |
|---|---|---|
| WO | WO 01/48097 A1 | 7/2001 |
| WO | WO 02/066541 A1 | 8/2002 |
| WO | WO 2006/083343 | 8/2006 |
| WO | WO 2006/138198 | 12/2006 |
| WO | WO 2007/001567 | 1/2007 |
| WO | WO 2007/001571 A1 | 1/2007 |
| WO | WO 2007/078851 | 7/2007 |
| WO | WO 2009/085097 A1 | 7/2009 |
| WO | WO 2009/156457 A1 | 12/2009 |
| WO | WO 2013/098218 A1 | 7/2013 |
| WO | WO 2014/203857 A1 | 12/2014 |
| WO | WO 2015/156094 A1 | 10/2015 |

OTHER PUBLICATIONS

International Search Report and Written Opinion for PCT/US2017/018563 dated Apr. 6, 2017.
International Search Report and Written Opinion for PCT/US2010/000212 dated Apr. 7, 2010.
International Search Report and Written Opinion for PCT/US2010/000213 dated Apr. 8, 2010.
International Search Report and Written Opinion for PCT/US2010/000214 dated Apr. 7, 2010.
International Search Report and Written Opinion for PCT/US2010/000215 dated Apr. 7, 2010.
International Search Report and Written Opinion for PCT/US2010/000216 dated Mar. 19, 2010.
International Search Report and Written Opinion for PCT/US2015/057524 dated Jun. 17, 2016.
Anonymous, "The Use of Cycloaliphatic Diacids and Anhydrides as Monomers for Polyester Polymers to Improve their Compatibility with Acrylic Polymers", Research Disclosure, 360, (1994), pp. 229-230.
Couchman, P. R.; "Compositional Variation of Glass-Transition Temperatures. 2. Application of the Thermodynamic Theory to Compatible Polymer Blends"; Macromolecules 1978, 11(6); pp. 1156-1161.
Heidt, et al., "Florida weathering of Isophthalic Acid-Based, Melamine-Crosslinked Polyester Coatings", Proceedings of the Twenty-Seventh International Waterborne, High Solids and Powder Coatings Symposium (2000), $27^{th}$ 295-307.
Husbands, M.J., et al., "Polyester Resins", A Manual of Resins for Surface Coatings, vol. III, pp. 63-167.
Jorissen, D.A., et al., "Higher Solids Polyurethane Coatings", Proceedings of the International Waterborne, High-Solids and Powder Coatings Symposium, (1992), $19^{th}$ ed. pp. 182-195.
"Coating Processes (Powder Technology)"; Kirk-Othmer Encyclopedia of Chemical Technology, $4^{th}$ Edition, vol. 6, p. 641.
Ni, Hai, et al., "Cycloaliphatic Polyester Based High Solids Polyurethane Coatings: I. The Effect of Difunctional Alcohols", Journal of Coatings Technology, vol. 74, No. 928 (2002), pp. 49-56.
Oldring, P.K.T., et al., "Vinyl and Acrylic Monomers", A Manual of Resins for Surface Coatings, vol. II, pp. 121-210.
Oldring, P.K.T. et al.; Resins for Surface Coatings; vol. III; pp. 63-167; SITA Technology; London, UK; 1987.
Seo, Kab S., et al. "Drying Characteristics and Rheology of Carboxymethylcellulose Acetate Butyrate in Waterborne Coatings", Proceedings of the Thirty First International Waterborne, High-Solids, and Powder Coatings Symposium (2004), pp. 221-236.
Vandevoorde, P., et al. "Making solid gains Novel acrylic and polyester polyols reduce VOCs in solventborne urethanes", European Coatings Journal (2005) (9) pp. 22-24, 26-29.
Wicks, Zeno Jr., et al., "Polyester Resins", Organic Coatings Science and Technology, 2nd ed., 13, (1999), p. 246-257.
Co-pending U.S. Appl. No. 14/865,112, filed Sep. 25, 2015, Inglefield et al.
Co-pending U.S. Appl. No. 15/078,537, filed Mar. 23, 2016, Zhou et al.
International Search Report and Written Opinion for PCT/US2015/057529 dated Jan. 27, 2016.
International Search Report and Written Opinion for PCT/US2012/045357 dated Sep. 24, 2012.
ASTM D522; Standard Test Methods for Mandrel Bend Test of Attached Organic Coatings.
ASTM D1639-90; Standard Test Method for Acid Value of Organic Coating Materials.
ASTM D2794; Standard Test Method for Resistance of Organic Coatings to the Effect of Rapid Deformation (Impact).
ASTM D3281; Standard Test Method for Formability of Attached Organic Coatings with Impact-Wedge Bend Apparatus.
ASTM D3359-09ε2; Standard Test Methods for Measuring Adhesion by Tape Test.
ASTM D3363; Standard Test Method for Film Hardness by Pencil Test.
ASTM D3418; Standard Test Method for Transition Temperatures and Enthalpies of Fusion and Crystallization of Polymers by Differential Scanning Calorimetry.
ASTM D4274-11; Standard Test Methods for Testing Polyurethane Raw Materials: Determination of Hydroxyl Numbers of Polyols.
ASTM D4287; Standard Test Method for High-Shear Viscosity Using a Cone/Plate Viscometer.
ASTM D4366; Standard Test Method for Hardness of Organic Coatings by Pendulum Damping Tests.
ASTM D4752-10; Standard Practice for Measuring MEK Resistance of Ethyl Silicate (Inorganic) Zinc-Rich Primers by Solvent Rub.
ASTM D5402-15; Standard Practice for Assessing the Solvent Resistance of Organic Coatings Using Solvent Rubs.
ASTM D6279; Standard Test Method for Rub Abrasion Mar Resistance of High Gloss Coatings.
Biedermann et al.; "Phenolic resins for can coatings: II. Resoles based on cresol/phenol mixtures of tert. butyl phenol"; LWT—Food Science and Technology; 39; (2006); pp. 647-659 (Elsevier).
Narayan et al.; "Properties of acetoacetylated hydroxylated polyesters based polyurethane coatings"; Progress in Organic Coatings; 45; (2002); pp. 59-67.
The Chemisty of Polyurethane Coatings, Technical Publication, p. 20, by Bayer Material Science, 2005.
Witzeman et al.; "Comparison of Methods for the Preparation of Acetoacetylated Coating Resins"; Journal of Coatings Technology; vol. 62; No. 789; Oct. 1990; pp. 101-112.
Zhang, Musan et al.; "Tailoring adhesive performance of sulfonated segmented block copolymers"; Database CA [Online]; Chemical Abstracts Service; XP002682877.
International Search Report and Written Opinion for PCT/US2016/32646 dated Aug. 16, 2016.
International Search Report and Written Opinion for PCT/US16/52810 dated Dec. 15, 2016.
Dyab et al.; "Non-Aqueous Emulsions Stabilised by Nonionic Nonyl Phenol Ethoxylate Reactive Polymerisable Surfactants"; International Journal of Electrochemical Science; 8; 2013; pp. 9868-9885.
Stepan Product Bulletin for MAKON® TSP-12, TSP-16, TSP-20, TSP-25, TSP-40 & TSP-60.
Vogel et al.; "Near-Zero VOC Waterborne Alkyd Dispersions with Solventborne Alkyd Performance"; CoatingsTech; Jun. 2016; pp. 29-39.

* cited by examiner

THERMOSETTING COATING COMPOSITIONS

CROSS REFERENCE TO RELATED APPLICATIONS

This application claims the benefit of Provisional Application 62/298,109 filed on Feb. 22, 2016 under 35 USC § 119(e)(1), the entire content of which is incorporated herein by reference.

FIELD OF THE INVENTION

The present invention relates to polyester-based thermosetting liquid coating compositions.

BACKGROUND OF THE INVENTION

Thermosetting protective coatings are widely used in original equipment manufacturer (OEM) and industrial maintenance fields. Binder resin options for these materials generally include polyester, epoxy, alkyd, and acrylic resins and can be formulated with different cross-linking materials. As the coatings industry faces stricter regulations with VOC emissions, waterborne versions of the binders used in such coatings which show good long-term stability and similar performance to their solvent-borne counterparts are of interest. Historically, there have been different approaches to achieving stable, solvent-free waterborne polyesters, but prolonged stability has been a challenge. In order to protect the polyester from hydrolysis in the presence of water, a stabilizing mechanism must be employed. In emulsion chemistry, other resin technologies have been successfully emulsified including alkyds, but traditional polyester resins that do not have fatty acid modification are more hydrophilic and thus make it problematic to identify a surfactant choice that has the proper interaction at the particle/water interface during inversion. Moreover, the level of surfactant must be at an acceptable level that does not impact the final film performance such as adhesion and water sensitivity. There are industry sectors trying to move towards lower volatile organic content (VOC) thermosetting coatings solutions. Thus, there exists a desire for the additional choice of a waterborne technology that can provide the balance of properties in a thermosetting coating application.

Surfactant choice for emulsification of polyesters must meet several criteria. For nonionic surfactants, the hydrophobia must show strong interaction capabilities with the polyester to enable dispersion in an aqueous continuous phase at elevated temperatures and maintain that interaction at room temperature. The surfactant must also be stable over the temperature range encountered during the emulsification process. Third, the surfactants must have cloud points sufficient to remain stable in the oil phase during the early stages of the emulsion process.

Such surfactants typically contain hydrophobes such as alkyl phenols, fatty acids, and fatty alcohols. These surfactants, though they show some interaction with conventional polyesters, have limitations on the stability of the emulsion over the desired emulsification temperature range. Thus, there exists a need to identify a surfactant class that provides aqueous polyester resins with an improved balance of stability and performance properties in a thermosetting coatings application.

SUMMARY OF THE INVENTION

The present invention provides an aqueous polyester emulsion comprising:
a) a curable polyester;
b) a non-ionic emulsifier having the structure;

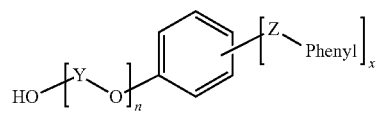

wherein —Z— Phenyl is a substituent on the benzene ring, each Z is independently a divalent $C_1$ to $C_4$ hydrocarbon radical, x is the number of said substituent(s) ranging from 1 to 5, Y is a divalent $C_1$ to $C_4$ hydrocarbon radical, and n is an integer from 1 to 100, and
c) water.

The aforementioned emulsions are useful as components in thermosetting coating compositions and can be combined with suitable cross-linking compounds and/or resins which are reactive with free hydroxyl groups and/or carboxyl groups on the curable polyester. Additionally, such emulsions may be augmented (i.e., blended) with co-resins from other resin classes to formulate coating compositions having desired performance characteristics. Alternately, the co-resin(s) may be added prior to the emulsification step.

DETAILED DESCRIPTION OF THE INVENTION

In one embodiment, the invention provides an aqueous polyester emulsion comprising:
a) a curable polyester;
b) a non-ionic emulsifier having the structure;

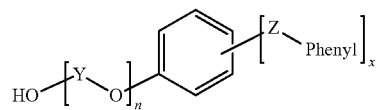

wherein each Z is independently a divalent $C_1$ to $C_4$ hydrocarbon radical, x is an integer ranging from 1 to 5, Y is a divalent $C_1$ to $C_4$ hydrocarbon radical, and n is an integer from 1 to 100, and
c) water.

The aforementioned emulsions are useful as components in thermosetting coating compositions.

In another embodiment, the invention provides a thermosetting composition comprising:
a) an aqueous polyester emulsion comprising:
   i. a curable polyester;
   ii. a non-ionic emulsifier having the structure;

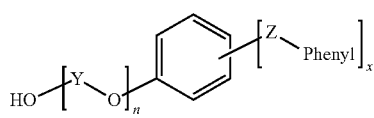

wherein each Z is independently a divalent $C_1$ to $C_4$ hydrocarbon radical, x is an integer ranging from 1 to 5, Y is a divalent $C_1$ to $C_4$ hydrocarbon radical, and n is an integer from 1 to 100, and iii. water; and b) a cross-linker.

In general, surfactants can be classified into two types—ionic and non-ionic. Ionic surfactants contain either anionic or cationic end groups with their counter ions, which are known to be particularly effective in emulsifying polymers. However, their ionic characteristics are also known to cause water sensitivity of the coating films, thus rendering them not desirable for coating applications that require adequate water resistance. Non-ionic surfactants are generally based on molecules having long-chain etherate groups. This type of surfactant can provide improved water resistance; however, they are less effective in emulsifying polymers. In the initial work of this invention, common non-ionic surfactants, such as alkylphenol ethoxylate and ethoxylated fatty alcohol, were used to emulsify the polyesters without success. Such surfactants failed to provide homogeneous, stable polyester emulsions. However, we have found surprisingly that non-ionic phenol ethoxylate surfactants with bulky substituents on the benzene ring are capable of effectively emulsifying polyesters to provide stable aqueous polyester emulsions.

The polyarylphenol ethoxylate non-ionic emulsifier suitable for this invention is a derivative of phenol ethoxylate having 1 to 5 phenyl substituents. Each phenyl substituent is linked to the phenol ethoxylate moiety via a $C_1$ to $C_4$ hydrocarbon radical. The hydrocarbon radical may be saturated or unsaturated, linear or branched, substituted or unsubstituted. The ethoxylate moiety can be derived from ethylene oxide, propylene oxide, butylene oxide, or isobutylene oxide; the ethoxylate can have 1 to 100 repeating units. Examples of polyarylphenol ethoxylates include tristyrylphenol ethoxylate (1) and others with similar structures—(2) and (3).

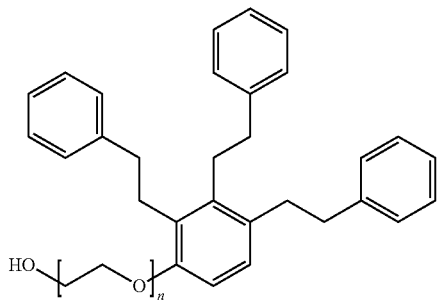

1

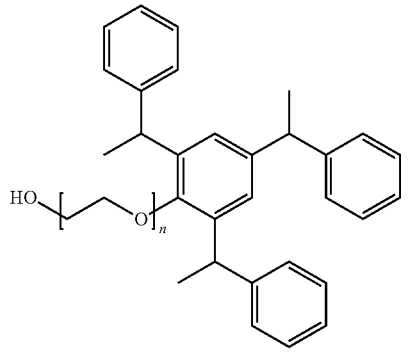

2

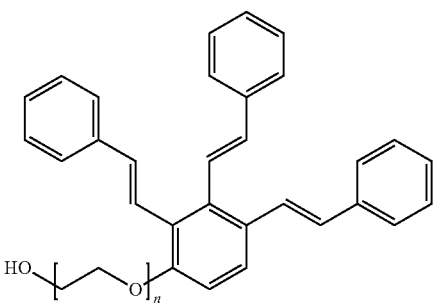

3

Tristyrylphenol ethoxylate (1) is an ethoxylated tristyrylphenol; tristyrylphenol in turn is a mixture of mono-, di-, and tri-styryl functionalized phenol. Tristyrylphenol ethoxylate can be prepared by reacting tristyrylphenol with various mole ratios of one or more epoxides to yield ethoxylates having various numbers of repeating units, for example, having averages of 16, 20, 25, 40, and 60 repeating units. Such emulsifiers are available as commercial products: Makon® TSP-16 (Stepan Company), Makon® TSP-20 (Stepan Company), Makon® TSP-25 (Stepan Company), Makon® TSP-40 (Stepan Company), and Makon® TSP-60 (Stepan Company).

In certain embodiments, the polyarylphenol ethoxylate non-ionic emulsifier (b) is present in an amount ranging from 1 to 15, 2 to 10, 3 to 8, or 4 to 7 weight % based on the weight of the curable polyester (a).

The polyester emulsion of the invention may further comprise an ionic surfactant to further stabilize the emulsion. In certain embodiments, the ionic surfactant is present in an amount less than 5, or less than 4, or less than 3, or less than 2 weight % based on the weight of the curable polyester (a).

The ionic surfactant may be a sulfate, a sulfonate, a phosphate, or a carboxylate. The sulfate may be an alkyl sulfate, alkyl benzene sulfate, or an alkyl ether sulfate. Examples of alkyl sulfates include sodium dodecyl sulfate, ammonium lauryl sulfate, sodium dodecyl benzenesulfonate, sodium decyl sulfate, sodium octyl sulfate, sodium 2-ethylhexyl sulfate, and other $C_8$ to $C_{12}$ alkyl sulfates. Examples of alkyl ether sulfates include sodium lauryl ether sulfate, sodium myreth sulfate, and other $C_8$ to $C_{18}$ alkyl ether sulfates.

The sulfonate may be a dialkyl sodium sulfosuccinate such as, for example, dioctyl sodium sulfosuccinate, or an alkyl benzene sulfonate such as, for example, sodium decylbenzene sulfonate, sodium dodecylbenzene sulfonate, or other $C_{10}$ to $C_{16}$ alkyl benzene sulfonates, or an alkyl benzene ether sulfonate such as poly(ethylene glycol) 4-nonylphenyl 3-sulfopropyl ether potassium salt, or a sulfonate fluorosurfactant such as perfluorooctanesulfonate or perfluorobutanesulfonate, or an alkyldiphenyloxide disulfonates such as DOWFAX 2A1 available from Dow Chemical Co. The phosphate may be an alkyl aryl ether phosphate or an alkyl ether phosphate. The carboxylate may be an alkyl carboxylate such as sodium stearate or a carboxylate fluorosurfactant, such as perfluorononanoate or perfluorooctanoate. In certain embodiments, sodium dodecyl sulfate (for example, Polystep® B-11 from Stepan Company) and ammonium lauryl sulfate are utilized.

In one embodiment, the curable polyester (a) can be prepared by reacting a polyhydroxyl compound with a polycarboxyl compound. Such a polyester suitable for this invention comprises the residues of:

a) polyhydroxyl compounds comprising:
  i. diol compounds in an amount of 50 mole % to 100 mole %; and
  ii. polyol compounds having 3 or more hydroxyl groups in an amount of 0 to 50 mole %;
  wherein the mole % is based on 100% of all moles of polyhydroxyl compounds a); and
b) polycarboxyl compounds comprising:
  i. dicarboxylic acid compounds, derivatives of dicarboxylic acid compounds, the anhydrides of dicarboxylic acids, or combinations thereof; and/or
  ii. tricarboxylic acid compounds having 3 carboxylic acid groups For purposes of calculating quantities, all compounds having at least one hydroxyl group are counted as polyhydroxyl compounds (a). Such compounds include, but are not limited to, mono-ols, diols, polyol compounds having 3 or more hydroxyl groups, and for each of the foregoing, can be hydrocarbons of any chain length optionally containing ether groups such as polyether polyols, ester groups such as polyester polyols, and amide groups.

For purposes of calculating quantities, all compounds having at least one carboxyl group are counted as carboxyl compounds (a). Such compounds include, but are not limited to, monocarboxylic acids, dicarboxylic acids, and tricarboxylic acid compounds (having 3 carboxyl groups).

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to a plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "curable polyester", as used herein, is synonymous with the term "resin" and intended to mean a thermosetting surface coating polymer prepared by the polycondensation of one or more polycarboxyl components, diol components, and polyol components. The curable polyester of the present invention is particularly suitable as a resin for coatings. The polyester has reactive functional groups, typically hydroxyl groups and/or carboxyl groups for the purpose of later reacting with cross-linkers in a coating formulation. The functional group is controlled by having either excess hydroxyl (from diol or polyol) or acid (from dicarboxylic acid or tricarboxylic acid) in the polyester resin composition. The desired cross-linking pathway will determine whether the polyester resin will be hydroxyl-terminated or carboxylic acid-terminated. The concept is known to those skilled in the art and described, for example, in *Organic Coatings Science and Technology*, 2nd ed., p. 246-257, by Z. Wicks, F. Jones, and S. Pappas, Wiley, New York, 1999.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid monomer or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a polyhydroxyl compound(s) to make a curable polyester.

The diols (a)(i) have two hydroxyl groups and can be branched or linear, saturated or unsaturated, aliphatic or cycloaliphatic $C_2$-$C_{20}$ compounds, the hydroxyl groups being primary, secondary, and/or tertiary. Desirably, the polyhydroxyl compounds are hydrocarbons and do not contain atoms other than hydrogen, carbon and oxygen. Examples of diols (a)(i) include 2,2,4,4-tetraalkylcyclobutane-1,3-diol (TACD), 2,2-dimethyl-1,3-propanediol (neopentyl glycol), 1,2-cyclohexanedimethanol, 1,3-cyclohexanedimethanol, 1,4-cyclohexanedimethanol, isosorbide, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, and polyethylene glycol.

The TACD compound can be represented by the general structure (4):

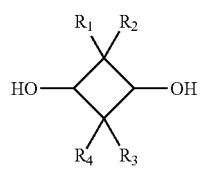

wherein $R_1$, $R_2$, $R_3$, and $R_4$ each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals.

Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol.

In certain embodiments, the diol (a)(i) is 2,2,4,4-tetramethylcyclobutane-1,3-diol (TMCD), 2,2-dimethyl-1,3-propanediol (neopentyl glycol), 1,2-cyclohexanedimethanol, 1,3-cyclohexanedimethanol, 1,4-cyclohexanedimethanol, isosorbide, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol or mixtures thereof. In one embodiment, at least one of the diols (a)(i) is TMCD.

In certain embodiments, the diols (a)(i) are present in an amount of at least 50 mole %, or at least 55 mole %, or at least 60 mole %, or at least 65 mole %, or at least 70 mole %, or at least 75 mole %, or at least 80 mole %, or at least 85 mole %, or at least 87 mole %, or at least 90 mole %, or at least 92 mole %, based on 100 mole % of all polyhydroxyl compounds. Additionally, or in the alternative, the diols (a)(i) can be present in an amount of up to 100 mole %, or up to 98 mole %, or up to 96 mole %, or up to 95 mole %, or up to 93 mole %, or up to 90 mole %, based on 100 mole % of all hydroxyl compounds. In certain embodiments, suitable ranges include, in mole % based on 100 mole % of all hydroxyl compounds (a), 50-100, or 55-100, or 60-100, or 65-100, or 70-100, or 75-100, or 80-100, or 85-100, or 87-100, or 90-100, or 92-100, or 95-100, or 96-100, or 50-98, or 55-98, or 60-98, or 65-98, or 70-98, or 75-98, or 80-98, or 85-98, or 87-98, or 90-98, or 92-98, or 95-98, or 96-93, or 50-93, or 55-93, or 60-93, or 65-93, or 70-93, or 75-93, or 80-93, or 85-93, or 87-93, or 90-93, or 92-93, or 50-90, or 55-90, or 60-90, or 65-90, or 70-90, or 75-90, or 80-90, or 85-90, or 87-90.

The polyol compounds (a)(ii) having three or more hydroxyl groups can be branched or linear, saturated or unsaturated, aliphatic or cycloaliphatic $C_2$-$C_{20}$ compounds, the hydroxyl groups being primary, secondary, and/or tertiary, and desirably at least two of the hydroxyl groups are primary. In certain embodiments, the polyol compounds are hydrocarbons and do not contain atoms other than hydrogen, carbon and oxygen. Examples of the polyol compounds (a)(ii) include 1,1,1-trimethylol propane, 1,1,1-trimethylolethane, glycerin, pentaerythritol, erythritol, threitol, dipentaerythritol, sorbitol, mixtures thereof, and the like.

The polyol compounds (a)(ii), if present, can be present in an amount of at least 1 mole %, or at least 2 mole %, or at least 5 mole %, or at least 8 mole %, or at least 10 mole %, based on 100 mole % of all polyhydroxyl compounds (a). Additionally, or in the alternative, the polyol compounds (a)(ii) can be present in an amount of up to 50 mole %, or up to 45 mole %, or up to 40 mole %, or up to 35 mole %, or up to 30 mole %, or up to 25 mole %, or up to 20 mole %, or up to 15 mole %, or up to 13 mole %, or up to 10 mole %, or up to 8 mole %, based on 100 mole % of all hydroxyl compounds (a). In certain embodiments, suitable ranges of the polyol compounds (a)(ii) include, in mole % based on 100 mole % of all polyhydroxyl compounds (a), 1-50, or 2-50, or 5-50, or 8-50, or 10-50, or 1-45, or 2-45, or 5-45, or 8-45, or 10-45, or 1-40, or 2-40, or 5-40, or 8-40, or 10-40, or 1-35, or 2-35, or 5-35, or 8-35, or 10-35, or 1-30, or 2-30, or 5-30, or 8-30, or 10-30, or 1-25, or 2-25, or 5-25, or 8-25, or 10-25, or 1-20, or 2-20, or 5-20, or 8-20, or 10-20, or 1-15, or 2-15, or 5-15, or 8-15, or 10-15, or 1-13, or 2-13, or 5-13, or 8-13, or 10-13, or 1-10, or 2-10, or 5-10, or 8-10, or 1-8, or 2-8, or 5-8%.

In certain embodiments, the mole % of the diol (a)(i) is from 50 to 100, 80 to 97, or 85 to 95, and the mole % of the polyol compound (a)(ii) is from 0 to 50, 3 to 20, or 5 to 15.

The polycarboxyl compounds (b) contain at least polycarboxylic acid compounds, derivatives of polycarboxylic acid compounds, the anhydrides of polycarboxylic acids, or combinations thereof. Suitable polycarboxylic acid compounds include compounds having at least two carboxylic acid groups. The polycarboxylic acid compounds are capable of forming ester linkages with polyhydroxyl compounds. For example, a polyester can be synthesized by using a polyhydroxy compound and a dicarboxylic acid or a derivative of a dicarboxylic acid such as, for example, dimethyl ester or other dialkyl esters of the diacid, or diacid chloride or other diacid halides, or acid anhydride.

The polycarboxylic acid compounds (b) can be a combination of aromatic polycarboxylic acid compounds and either or both of aliphatic or cycloaliphatic polycarboxylic acid compounds. For example, the polycarboxylic acid compounds (b) can include aromatic polycarboxylic acid compounds and aliphatic polycarboxylic acids compounds having 2 to 22 carbon atoms; or aromatic polycarboxylic acid compounds and cycloaliphatic polycarboxylic acids compounds having 2 to 22 carbon atoms; or aromatic polycarboxylic acid compounds, aliphatic polycarboxylic acids compounds having 2 to 22 carbon atoms; and cycloaliphatic polycarboxylic acids compounds having 2 to 22 carbon atoms.

Examples of such polycarboxylic compounds (b) that form the polycarboxylic (b) residues in the curable polyester include those having two or more carboxylic acid functional groups or their esters. In certain embodiments, such polycarboxylic acid compounds contain only two carboxylic acid functional groups. Examples of these compounds include aliphatic dicarboxylic acids, alicyclic dicarboxylic acids, aromatic dicarboxylic acids, derivatives of each, or mixtures of two or more of these acids, or the $C_1$-$C_4$ ester derivatives thereof. Suitable dicarboxylic acids include, but are not limited to, isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, hexahydrophthalic anhydride, tetrahydrophthalic anhydride, tetrachlorophthalic anhydride, dodecanedioic acid, sebacic acid, azelaic acid, succinic anhydride, succinic acid, adipic acid, 2,6-naphthalenedicarboxylic acid, glutaric acid, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

Anhydride analogs to each of the polycarboxyl compounds (b) described above can be used. This would include the anhydrides of polycarboxylic acids having at least two acyl groups bonded to the same oxygen atom. The anhydrides can be symmetrical or unsymmetrical (mixed) anhydrides. The anhydrides have at least one anhydride group, and can include two, three, four, or more anhydride groups. Specific examples of anhydrides of the dicarboxylic acids include, but are not limited to, maleic anhydride, maleic acid, fumaric acid, itaconic anhydride, itaconic acid, citraconic anhydride, citraconic acid, aconitic acid, aconitic anahydride, oxalocitraconic acid and its anhydride, mesaconic acid or its anhydride, beta-acylacrylic acid, phenyl maleic acid or its anhydride, t-butyl maleic acid or its anhydride, monomethyl fumarate, monobutyl fumarate, methyl maleic acid or its anhydride, or mixtures thereof.

In certain embodiments, the polycarboxylic component (b) includes isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, adipic acid, 2,6-naphthalenedicarboxylic acid, 1,4-naphthalenedicarboxylic acid; 2,5-naphthalenedicarboxylic acid; hexahydrophthalic anhydride, tetrahydrophthalic anhydride, trimellitic anhydride, succinic anhydride, succinic acid, or mixtures thereof. Trimellitic acid or its anhydride is a useful compound to add in order to increase the acid number of the curable polyester if so desired.

In certain embodiments, the curable polyester of the invention has a hydroxyl number of from about 10 to about 200 mg KOH/g or from about 20 to about 100 or from about 30 to about 60. In other embodiments, the acid number is less than 50, less than 40, less than 30, less than 20, or less than 15. In yet a further embodiment, the acid numbers are from 3 to 15 mg KOH/g.

Acid and hydroxyl numbers are determined by titration and are reported herein as mg KOH consumed for each gram of polyester. The acid number can be measured by ASTM D1639-90 test method. The hydroxyl numbers can be measured by the ASTM D4274-11 test method.

The glass transition temperature (Tg) of the polyester of the present invention may be from −40° C. to 120° C., from −10° C. to 100° C., from 10° C. to 80° C., from 10° C. to 60° C., from 10° C. to 50° C., from 10° C. to 45° C., from 10° C. to 40° C., from 20° C. to 80° C., from 20° C. to 60° C., from 20° C. to 50° C., from 30° C. to 80° C., from 30° C. to 70° C., from 30° C. to 60° C., from 30° C. to 50° C., or from 35° C. to 60° C. The Tg is measured on the dry polymer using standard techniques, such as differential scanning calorimetry ("DSC"), well known to persons skilled in the art. The Tg measurements of the polyesters are conducted using a "dry polymer," that is, a polymer sample in which adventitious or absorbed water is driven off by heating the polymer to a temperature of about 200° C. and allowing the sample to return to room temperature. Typically, the polyester is dried in the DSC apparatus by conducting a first thermal scan in which the sample is heated to a temperature above the water vaporization temperature, holding the sample at that temperature until the vaporization of the water absorbed in the polymer is complete (as indicated by a large, broad endotherm), cooling the sample to room temperature, and then conducting a second thermal scan to obtain the Tg measurement. (See ASTM D3418.)

The number average molecular weight (Mn) of the polyester of the present invention is not limited, and in certain embodiments may be from 1,000 to 20,000, from 1,000 to 15,000, from 1,000 to 12,500, from 1,000 to 10,000, from 1,000 to 8,000, from 1,000 to 6,000, from 1,000 to 5,000, from 1,000 to 4000, from 1,000 to 3,000, from 1,000 to 2,500, from 1,000 to 2,250, or from 1,000 to 2,000, in each case g/mole. The Mn is measured by gel permeation chromatography (GPC) using polystyrene equivalent molecular weight.

The weight average molecular weight (Mw) of the polyester can be from 1,000 to 500,000; from 1,500 to 100,000; and in certain embodiments is from 2,000 to 50,000 or from 2,500 to 25,000 g/mole. The polyester may be linear or branched.

In certain embodiments, the (a)(i) diol includes 2,2-dimethyl-1,3-propanediol (neopentyl glycol); 1,2-cyclohexanedimethanol; 1,3-cyclohexanedimethanol; 1,4-cyclohexanedimethanol; 2-methyl-1,3-propanediol; TMCD; 2,2,4-trimethyl-1,3-pentanediol; hydroxypivalyl hydroxypivalate; 2-butyl-2-ethyl-1,3-propanediol; 1,4-butanediol; 1,6-hexanediol; or combinations thereof.

In certain embodiments, the (a)(ii) polyol compound having 3 or more hydroxyl groups include 1,1,1-trimethylol propane, 1,1,1-trimethylolethane, glycerin, pentaerythritol, or combinations thereof.

In certain embodiments, the (b) compounds include isophthalic acid (or dimethyl isophthalate), 1,4-cyclohexanedicarboxylic acid, 1,3-cyclohexanedicarboxylic acid, adipic acid; phthalic acid; or combinations thereof.

The curable polyester can be prepared by any conventional process for the preparation of polyesters. For example, the polyester resin can be prepared by combining polyhydroxyl compounds (a) with the polycarboxyl compounds (b) in a reaction vessel under heat to form a reaction mixture comprising the polyester in a batch or continuous process and in one or more stages, optionally with the continuous removal of distillates and applied vacuum during at least part of the residence time. Polyhydroxyl compounds (a) and polycarboxyl compounds (b) are combined and reacted in at least one reactor at a temperature from 180-250° C., optionally in the presence of an acid catalyst. Optionally, a catalyst may be used to promote the synthesis of the polyester. The catalyst may be any catalyst known in the art to be useful for the formation of polyester polymers. For example, the catalyst can be a tin catalyst, such as, for example, FASCAT™ 4100 (available from Arkema Corporation). The catalyst increases the rate of the polyester resin reaction, and its amount may be determined by routine experimentation as understood by those skilled in the art. Ordinarily, the catalyst is added in amounts ranging about 0.01 to about 1.00 weight percent based on the total weight of the reactants. Desirably, a distillate is removed from the reactor.

The polyester emulsion of the invention may further comprise a neutralizing agent to neutralize the carboxylic acid end groups present in the curable polyester to further stabilize the emulsion. The neutralizing agent may be an amine or an inorganic base. Typical amines include ammonia, trimethylamine, diethylamine, monoethanolamine, monoisopropanolamine, morpholine, ethanolamine, diethanolamine, triethanolamine, N,N-dimethylethanolamine, N,N-diethylethanolamine, N-methyldiethanolamine and the like.

Typical inorganic bases include bases derived from alkali metals and alkaline earth metals such as; sodium, potassium, magnesium, calcium, and other basic metal compounds. Suitable bases from this first class of bases useful in the present invention include, but are not limited to, sodium oxide, potassium oxide, magnesium oxide, calcium oxide, sodium hydroxide, potassium hydroxide, magnesium hydroxide, calcium hydroxide, sodium carbonate, potassium carbonate, sodium bicarbonate, potassium bicarbonate, calcium carbonate, magnesium bicarbonate, alkali metal borate compounds and their hydrates, sodium phosphate, potassium biphosphate, and sodium pyrophosphate.

In other embodiments, one or more additional resins are added ("co-resins") to the coating composition to adjust desired performance characteristics of the resulting coating. Examples include but are not limited to conventional coatings resins such as waterborne acrylics for example those described in U.S. Pat. No. 9,034,964, incorporated herein by reference, polyurethanes (e.g., polyurethane dispersions), waterborne alkyds (for example, U.S. Pat. No. 9,200,177, incorporated herein by reference), alkyl epoxy esters, and the like. The co-resins may be ones prepared via solution polymerization, which can be added during the polyester emulsification process, such as acrylics (for example, those described in U.S. Pat. No. 8,168,721, incorporated herein by reference). In one embodiment, co-resins have carboxyl functionality for neutralization.

In the case of acrylic co-resins, such co-resins comprise at least one acrylic copolymer of ethylenically unsaturated monomers comprising at least one hydroxyl, epoxy, carboxyl, blocked phenol, or acetoacetoxy functional group. Such acrylic resins are typically prepared by free radical polymerization in bulk or in a solvent. Representative free-radical initiators include, but are not limited to, organic peroxides or azo compounds, such as benzoyl peroxide, t-butyl hydroperoxide, t-butyl peroxide, t-butyl peroxy-benzoate, azobisisobutyronitrile, and 2,2'-azobis(2,4-dimethyl)-valeronitrile. The reaction is preferably carried out at the reflux temperature of the solvent used, which is generally higher than the thermal decomposition temperature of the initiator employed. Suitable examples of preparation methods and components of the acrylic resin include those known in the art including, but not limited to, those described above, and in *Resins for Surface Coatings*, Vol. II, p. 121-210, ed. by P. K. T. Oldring and G. Hayward, SITA Technology, London, UK, 1987.

The acrylic resin comprises acrylic monomers copolymerized with other ethylenically unsaturated monomers that contain reactive functional groups as listed above. Some common examples of acrylic monomers acrylate esters, methacrylate esters, (meth)acrylic acid, and acrylamide monomers. Examples of ethylenically unsaturated monomers include, but are not limited to, mono- and dicarboxylic unsaturated acids, allylic monomers, and vinyl compounds such as, for example, vinyl aromatic hydrocarbons, vinyl aliphatic hydrocarbons, vinyl ethers, and vinyl esters. Mono- and dicarboxylic unsaturated acids include fumaric acid, maleic acid or anhydride, haconic acid, citraconic acid, mesaconic acid, muconic acid, glutaconic acid, aconitic acid, hydrosorbic acid, sorbic acid, α-chlorsorbic acid, cinnamic acid, and hydromuconic acid as well as esters of such acids. Examples of vinyl aromatic hydrocarbons include styrene, methyl styrenes and similar lower alkyl styrenes, chlorostyrene, vinyl toluene, vinyl naphthalene, and divinyl benzoate. Vinyl aliphatic hydrocarbon monomers include α-olefins such as ethylene, propylene, isobutylene, and cyclohexene as well as conjugated dienes such as 1,3-butadiene, methyl-2-butadiene, 1,3-piperylene, 2,3 dimethyl butadiene, isoprene, cyclopentadiene, and dicyclopentadiene. Some representative examples of vinyl esters include vinyl acetate, vinyl propionate, vinyl butyrates, vinyl benzoates, vinyl isopropyl acetates and similar vinyl esters. Vinyl alkyl ethers include methyl vinyl ether, isopropyl vinyl ether, n-butyl vinyl ether, and isobutyl vinyl ether.

Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl an cresyl glycidyl ethers reacted with acrylic and methacrylic acids, hydroxyl alkyl acrylates and methacrylate such as hydroxyethyl and hydroxypropyl acrylates and methacrylates, as well as amino acrylates and methacrylates. Acrylic acids include acrylic and methacrylic acid, ethacrylic acid, α-chloracrylic acid, α-cycanoacrylic acid, crotonic acid, β-acryloxy propionic acid, and β-styrl acrylic acid. Examples of acrylamide monomers include, but are not limited to, acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or isobutyl alkyl groups. In one embodiment, for example, the ethylenically unsaturated monomers of the acrylic copolymer (B) are chosen from at least one of acrylate, methacrylate, styrene, (meth)acrylic acid, and vinyl esters.

As noted above, the acrylic copolymer comprises at least one hydroxyl, epoxy, carboxyl, blocked phenol, or acetoacetoxy functional group obtained by copolymerizing ethylenically unsaturated monomers with other acrylate monomers such as methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate. Examples of carboxy containing monomers include acrylic acid and lower alkyl substituted acrylic acids such as for example, methacrylic acids. Examples of hydroxyl containing monomers include ethylenically unsaturated monomers such as, for example, hydroxyethyl methacrylate, hydroxyethyl acrylate, hydroxyhexyl acrylate, hydroxyhexyl methacrylate, hydroxypropyl acrylate, hydroxypropyl methacrylate, hydroxybutyl acrylate, hydroxylbutyl methacrylate and the like. The ratio of reagents and molecular weights of the resulting acrylic polymer can be chosen to give polymers with an average functionality (for example, the number of OH groups per molecule) greater than or equal to 2 or, in another example, greater than or equal to 4.

A typical way to form a polyester emulsion is to heat the polyester resin to a temperature that provides a flowable liquid, charge it into a reaction kettle, and then add the desirable surfactants until a homogenous mixture is achieved under low to mild shear conditions, for example stirring or agitation. Once homogeneity is reached, other necessary ingredients can be added and the mixture is then further heated to temperatures ranging from 85-100° C. for suitable viscosities that are capable of forming emulsions. Water is then introduced slowly into the reactor until inversion to an oil-in-water emulsion is observed. The resulting particles are then diluted further with water to a reasonable emulsion viscosity. For the manufacture of emulsions of the curable polyesters which have glass transition temperatures above 100° C., a special reaction setup that can tolerate pressurization is required, such as an autoclave reactor.

The polyester emulsion of the invention may further comprise the addition of a cosolvent to aid with the inversion process. In certain cases it may be desirable to introduce a cosolvent, if for example, the inherent viscosity of the polyester is above 0.20 dL/g. Inherent viscosity is measured in a polymer solution concentration of 0.50 g/dL in tetrahydrofuran (THF) at 25° C. with acetone as the drying solvent. One may appropriately use a solvent such as 2,2,4-trimethyl-1,3-pentanediol monoisobutyrate (Texanol™ ester alcohol, available from Eastman Chemical Company) or Solvent Naptha Petroleum, Heavy Aromatics (Aromatic 150 Fluid).

In another embodiment, there is provided a thermosetting composition comprising:
a) the polyester emulsion of the present invention; and
b) a cross-linker selected from amino resins, phenolic resins, isocyanate resins, isocyanate compounds, hydroxyalkylamide compounds, and epoxy resins.

The amino resin cross-linker (or cross-linking agent) is preferably a melamine-formaldehyde type cross-linking agent, i.e., a cross-linking agent having a plurality of —N(CH$_2$OR$^3$)$_2$ functional groups, wherein R$^3$ is C$_1$-C$_4$ alkyl, preferably methyl.

In general, the cross-linking agent may be selected from compounds of the following formulae, wherein R$^3$ is independently C$_1$-C$_4$ alkyl:

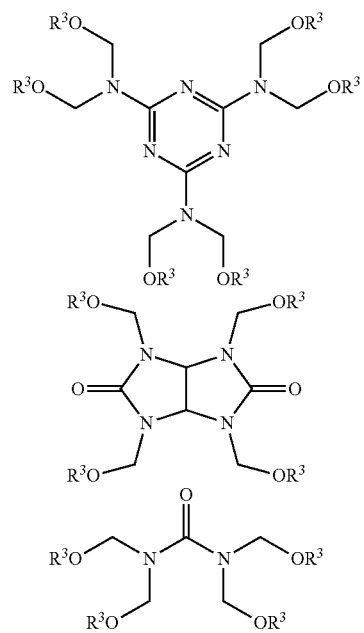

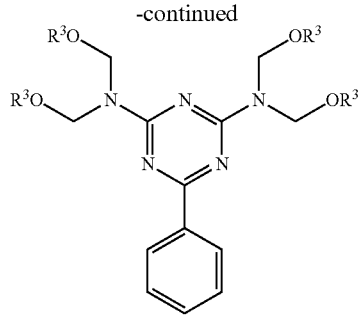

In certain embodiments, the cross-linking agents include hexamethoxymethylmelamine, tetramethoxymethylbenzoguanamine, tetramethoxymethylurea, mixed butoxy/methoxy substituted melamines, and the like.

The cross-linking agent may also be blocked or non-blocked isocyanate type. Examples of suitable isocyanate cross-linking agents include, but are not limited to, 1,6-hexamethylene diisocyanate, methylene bis (4-cyclohexyl isocyanate), isophorone diisocyanate, 2,4-toluene diisocyanate, and Bayhydur® 302 (BAYER MaterialScience), (modified hexamethylene diisocyanate for waterborne applications.)

The cross-linking agent may also be phenolic resin type cross-linker. Examples of suitable phenolic cross-linking agents include the condensation products of phenols with aldehydes such as formaldehyde and acetaldehyde. Various phenols can be used such as phenol, cresol, p-alkylphenol, p-phenylphenol, and resorcinol. The phenolic resin is desirably the resole type. Examples of suitable commercial phenolic resins include PHENODUR® PR 516/60B, PHENODUR® PR 371/70B, and PHENODUR® PR 612/80B available from Allnex; those with DUREZ® or VARCUM® trademarks available from Durex Corp.; and those with Bakelite® trademarks available from MOMENTIVE. Carboxyl functional polyesters may be cured with epoxy resins and hyrdoxyalkylamide cross-linkers such as Primid® sold by EMS-CHEMIE AG, Business Unit EMS-GRILTECH.

In certain embodiments, the cross-linker (II) is present in an amount from 5 to 50, 10 to 40, or 20 to 35 weight % based on the weight of the polyester solids in the polyester emulsion (I).

The thermosetting coating compositions of this invention may further comprise an organic co-solvent. Suitable co-solvents include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, and other water-miscible solvents. In some embodiments, water immiscible solvents may be used to help emulsify the polyester in the emulsification process. For example, xylene can be pre-mixed with the polyester to reduce its viscosity in the beginning of the emulsification process. Such water immiscible solvents include xylene, Aromatic 150 Fluid (Exxon Mobil), Aromatic 100 Fluid (Exxon Mobil), Eastman Texanol™ Ester Alcohol (2,2,4-trimethyl-1,3-pentanediol monoisobutyrate) available from Eastman Chemical Company, Eastman Optifilm™ enhancer 400 or 300 available from Eastman Chemical Company, n-butanol, isobutanol, and the like.

In certain embodiments, the curable polyesters used for waterborne thermosetting compositions comprise TMCD in the polyester compositions. We have found that TMCD based polyesters exhibit superior water dispersability over polyesters based on other diols such as NPG and CHDM.

In certain embodiments, the thermosetting coating compositions of the present invention further comprises an acid or base catalyst in an amount ranging from 0.1 to 2 weight %, based on the total weight of polyester and cross-linker. Examples of acid catalyst include protonic acids such as p-toluenesulfonic acid, dinonylnaphthalene disulfonic acid, dodecylbenzenesulfonic acid, phosphoric acid, and the like. The acid catalyst may also be Lewis acid or amine-blocked acid catalyst. Examples of base catalyst include amine such as ammonium hydroxide, triethylamine, N,N-dimethylethanolamine, and the like, and inorganic base such as sodium hydroxide, potassium hydroxide, and the like.

As a further aspect of the present invention, there is provided a coating composition as described above, further comprising one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; antisettling, anti-sag and bodying agents; anti-skinning agents; anti-flooding and anti-floating agents; fungicides and mildewicides; corrosion inhibitors; thickening agents; or coalescing agents.

Specific examples of such additives can be found in Raw Materials Index, published by the National Paint & Coatings Association, 1500 Rhode Island Avenue, N.W., Washington, D.C. 20005.

After formulation, the coating composition can be applied to a substrate or article and is not particularly limited and various metal components, ceramic components, or building materials may be suitable substrates, i.e., articles. Such articles may be uncompleted products such as a plate-shaped product or linear product and may be affixed to other products, a road vehicle, or an interior or exterior material of a building. Thus, a further aspect of the present invention is a shaped or formed article that has been coated with the coating compositions of the present invention. The substrate can be any common substrate such as paper; polymer films such as polyethylene or polypropylene; wood; metals such as aluminum, tin, steel or galvanized sheeting; glass; urethane elastomers; primed (painted) substrates; and the like. The coating composition can be coated onto a substrate using techniques known in the art, for example, by spraying, draw-down, roll-coating, etc., to form a dried coating having a thickness of about 0.1 to about 4 mils (1 mil=25 µm), or 0.5 to 3, or 0.5 to 2, or 0.5 to 1 mils on the substrate. The coating can be cured by heating to a temperature of about 150° C. to about 230° C., or desirably from 160° C. to 210° C., for a time period that may range from about 5 seconds to 10 minutes at higher temperatures or about 10 to about 90 minutes at lower temperatures, and allowed to cool.

This invention can be further illustrated by the following examples of certain embodiments thereof, although it will be understood that these examples are included merely for purposes of illustration and are not intended to limit the scope of the invention unless otherwise specifically indicated.

EXAMPLES

Example 1: Synthesis of Hydroxyl Functional Polyester (PE-1)

A 2-L kettle with a four-neck lid was equipped with a mechanical stirrer, a thermocouple, a heated partial condenser (107° C.), a Dean-Stark trap, and a chilled condenser (15° C.). The kettle was charged with 1,4-Bis (hydroxymethyl)cyclone, 90% in water (1-4, CHDM, 90% in water) (507.57 g), 2,2,4,4-tetramethyl-1,3-cyclobutanediol (TMCD) (151.94 g), 2-ethyl-2-hydroxymethyl-1,3-propane diol (TMP) (168.0 g); hexane-1,6-dicarboxylic acid (adipic acid, AA) (218.34 g), 2-benzofuran-1,3-dione (phthalic anhydride, PA) (516.78 g); and the acid catalyst, Fascat-4100 (PMC Organometallix) (2.10 g). The reaction was allowed to react under a nitrogen blanket. The temperature was ramped up from room temperature to 150° C. over 90 minutes. Once reaching the meltdown temperature of 150° C., the temperature was increased from 150 to 230° C. over 2 hours. When the maximum temperature of 230° C. was reached, the reaction was sampled every hour for acid number analysis with a target of 5-10 mgKOH/g. After achieving an acid number of 8.9, the resin was allowed to cool to 170° C. before being poured into aluminum pans. The resin was cooled and a solid product collected.

Using the same method as above, PE-2, PE-3, and PE-4 were synthesized. Alternative monomers were used in the various resins including: hexane-1,6-diol (Hexane Diol, HDO); 2,2-dimethyl-1,3-propanediol (neopentyl glycol, NPG); 2-methyl-1,3-propanediol (MPD) benzene-1,4-dicarboxylic acid (terephthalic acid, TPA); 1,4-cyclohexanedicarboxylic acid (CHDA); and benzene-1,3-dicarboxylic acid (isophthalic acid, IPA). The relative amounts and the results are reported in Tables 1 and 2, wherein Mn is number average molecular weight and Mw is weight average molecular weight.

TABLE 1

Synthesized Hydroxyl Functional Polyesters
Resin Composition as Charged

| | Molar Ratio Based on Total Alcohols (%) | | | | | | Molar Ratio Based on Total Diacids (%) | | | | | OH Eq./ COOH Eq. |
|---|---|---|---|---|---|---|---|---|---|---|---|---|
| | CHDM | TMCD | HDO | NPG | MPD | TMP | PA | AA | CHDA | IPA | TPA | |
| PE-1 | 58 | 19 | — | — | — | 23 | 70 | 30 | — | — | — | 1.22 |
| PE-2 | 65 | — | — | — | — | 35 | 70 | 30 | — | — | — | 1.22 |
| PE-3 | — | 17 | 27 | 35 | — | 21 | — | — | — | 65 | 35 | 1.21 |
| PE-4 | — | — | 44 | 35 | — | 21 | — | — | — | 65 | 35 | 1.21 |
| PE-5 | — | 48 | — | 48 | — | 5 | — | — | — | 100 | — | 1.20 |
| PE-6 | — | 45 | — | 45 | — | 10 | — | — | 30 | 70 | — | 1.13 |

TABLE 2

Resin Properties of Synthesized Hydroxyl Functional Polyesters

| Polyester | Tg, °C. | $M_n$, g/mol | $M_w$, g/mol | Acid Number, analyzed, mgKOH/gram | Hydroxyl Number, analyzed, mgKOH/gram |
|---|---|---|---|---|---|
| PE-1 | 28.3 | 3200 | 19,000 | 7.3 | 83 |
| PE-2 | 30.6 | 3500 | 89,000 | 8.9 | 94 |
| PE-3 | 37.1 | 2500 | 12,000 | 5.9 | 113 |
| PE-4 | 24.1 | 3100 | 15,000 | 6.7 | 94 |
| PE-5 | 59.7 | 2800 | 8000 | 1.8 | 56 |
| PE-6 | 31.1 | 4400 | 27,000 | 7.2 | 53 |

Example 5: Emulsification of Hydroxyl Functional Polyester (Emul-1)

A 500-mL kettle with a four-neck lid was equipped with a mechanical stirrer, a thermocouple and a water feed line. The kettle was charged with PE-1 (125 g), Makon® TSP-25 (Stepan Company) (6.25 g); and Polystep® B-11 (Stepan Company) (2.12 g). The mixture was heated to a temperature of 95-99° C. under agitation once fluid. Once reaching the meltdown temperature of 95-99° C., 2-(Dimethylamino)-ethanol (DMEA) (1.57 g) was added to the mixture and then allowed to equilibrate back to 95-99° C. When target emulsification temperature was reached, room temperature deionized water (DI Water) was fed into the reaction mixture at roughly 1 mL/minute until inversion was observed. Once inversion was achieved, the water feed was temporarily suspended and then allowed to cool to less than 60° C. Once a temperature of less than 60° C. was reached, the resulting emulsion was diluted to 50% solids. After dilution to target percent solids, the resin was allowed to cool to room temperature before being collected.

Using the same method as above, Emul-2, Emul-3, Emul-4, Emul-5, and Emul-6 were made with the remaining polyesters. Also, alternative nonionic surfactants were used to emulsify PE-3, including: Makon® TSP-16 (Stepan Company) and Makon® TSP-40 (Stepan Company). The relative amounts and the wet resin properties are reported in Tables 3 and 4 respectively, wherein Dv is the volume average particle diameter size; Dn is the number average particle diameter size; and PDI is the ratio expressed as Dv/Dn.

Example 11: Emulsification of Hydroxyl Functional Polyester (Emul-7)

A 500-mL kettle with a four-neck lid was equipped with a mechanical stirrer, a thermocouple and a water feed line. The kettle was charged with PE-5 (125 g), Makon® TSP-25 (Stepan Company) (6.25 g), Aromatic 150 Fluid (6.25 g) and Polystep® B-11 (Stepan Company) (2.12 g). The mixture was heated to a temperature of 95-99° C. under agitation once fluid. Once reaching the meltdown temperature of 95-99° C., 2-(Dimethylamino)-ethanol (DMEA) (0.38 g) was added to the mixture and then allowed to equilibrate back to 95-99° C. When target emulsification temperature was reached, room temperature deionized water (DI Water) was fed into the reaction mixture at roughly 1 mL/minute until inversion was observed. Once inversion was achieved, the water feed was temporarily suspended and then allowed to cool to less than 60° C. Once a temperature of less than 60° C. was reached, the resulting emulsion was diluted to 50% solids. After dilution to target percent solids, the resin was allowed to cool to room temperature before being collected. The wet resin properties are included in Table 4.

Example 12: Emulsification of Hydroxyl Functional Polyester (Emul-8)

A 500-mL kettle with a four-neck lid was equipped with a mechanical stirrer, a thermocouple and a water feed line. The kettle was charged with PE-6 (125 g), Texanol™ ester alcohol (12.5 g), Makon® TSP-25 (Stepan Company) (6.25 g), and Polystep® B-11 (Stepan Company) (2.12 g). The mixture was heated to a temperature of 95-99° C. under agitation once fluid. Once reaching the meltdown temperature of 95-99° C., 2-(Dimethylamino)-ethanol (DMEA) (0.94 g) was added to the mixture and then allowed to equilibrate back to 95-99° C. When target emulsification temperature was reached, room temperature deionized water (DI Water) was fed into the reaction mixture at roughly 1 mL/minute until inversion was observed. Once inversion was achieved, the water feed was temporarily suspended and then allowed to cool to less than 60° C. Once a temperature of less than 60° C. was reached, the resulting emulsion was diluted to 50% solids. After dilution to target percent solids, the resin was allowed to cool to room temperature before being collected. The wet resin properties are included in Table 4.

TABLE 3

Emulsified Hydroxyl Functional Polyester Resins
Emulsion Composition as Charged (g)

| | PE-1 | PE-2 | PE-3 | PE-4 | Makon® TSP-25 | Makon® TSP-16 | Makon® TSP-40 | Polystep® B-11 | DMEA | DI Water |
|---|---|---|---|---|---|---|---|---|---|---|
| Emul-1 | 125 | — | — | — | 6.25 | — | — | 2.12 | 1.57 | 130.05 |
| Emul-2 | — | 125 | — | — | 6.25 | — | — | 2.12 | 1.68 | 129.95 |
| Emul-3 | — | — | 125 | — | 6.25 | — | — | 2.12 | 1.57 | 130.05 |
| Emul-4 | — | — | — | 125 | 6.25 | — | — | 2.12 | 1.68 | 129.86 |
| Emul-5 | — | — | 125 | — | — | 6.25 | — | 2.12 | 1.57 | 159.50 |
| Emul-6 | — | — | 125 | — | — | — | 6.25 | 2.12 | 1.26 | 130.37 |

TABLE 4

Wet Resin Properties of Emulsified Hydroxyl Functional Polyesters

| Emulsion | NV, % | Visc.,cps | pH | Acid Number, analyzed, mgKOH/gram, on solids | Density, lb/gal | Particle Size Data | | |
|---|---|---|---|---|---|---|---|---|
| | | | | | | $D_v$, nm | $D_n$, nm | $D_v/D_n$ |
| Emul-1 | 50.1 | 170 | 8.0 | 11.4 | 9.12 | 260 | 190 | 1.4 |
| Emul-2 | 50.6 | 90 | 8.6 | 8.8 | 9.19 | 170 | 135 | 1.3 |
| Emul-3 | 50.4 | 110 | 8.4 | 9.1 | 9.11 | 150 | 120 | 1.3 |
| Emul-4 | 49.9 | 60 | 8.3 | 10.4 | 9.10 | 110 | 100 | 1.1 |
| Emul-5 | 45.9 | 50 | 7.7 | 9.8 | 8.95 | 190 | 140 | 1.4 |
| Emul-6 | 48.9 | 170 | 7.9 | 11.2 | 9.04 | 300 | 190 | 1.6 |
| Emul-7 | — | — | — | — | — | 610 | 560 | 1.1 |
| Emul-8 | 51.0 | 425 | 8.1 | 9.5 | — | 114 | 98 | 1.2 |

Example 13: Preparation of Water-Based Formulations Using Amino Resin Cross-linker As listed in Table 5, water-based formulations were prepared by using the emulsions, Emul-5, and Emul-6, and the commercially available amino resins, Cymel® 325 (Allnex) and Cymel® 327 (Allnex). Formulations were prepared by mixing respectively the polyester emulsion with the amino resins, catalyst (Cycat® 600, Allnex), organic solvents: Texanol™ ester alcohol (Eastman) and 2-Butoxyethanol (Eastman EB Solvent, EB) (Eastman), a surface additive, BYK 346 (BYK Additives and Instruments), a wetting and levelling additive, Dynoadd® F-601 (Dynea), and a surfactant, Surfynol® 104E (Air Products). All ingredients were added under agitation to ensure proper incorporation.

TABLE 5

Compositions of Various Formulations

| Formulation | Emulsion | Amino Resin | Cycat 600 | Texanol | EB | BYK-346 | Dynoadd F-601 | Surfynol 104E | Resin Ratio, PE/Amino |
|---|---|---|---|---|---|---|---|---|---|
| F-1 | 23.27 (Emul-5) | 5.61 (Cymel 325) | 0.25 | 0.75 | 0.48 | 0.15 | 0.15 | 0.58 | 70/30 |
| F-2 | 23.32 (Emul-5) | 5.00 (Cymel 327) | 0.25 | 0.75 | 1.09 | 0.15 | 0.15 | 0.58 | 70/30 |
| F-3 | 21.23 (Emul-6) | 5.57 (Cymel 325) | 0.25 | 0.74 | 0.49 | 0.15 | 0.15 | 0.53 | 70/30 |
| F-4 | 21.28 (Emul-6) | 4.97 (Cymel 327) | 0.25 | 0.74 | 1.09 | 0.15 | 0.15 | 0.53 | 70/30 |

Example 17: Evaluation of Cured Films by Various Coatings Tests

Formulations 1-4 prepared in Examples 11-15 were drawn down respectively on electrolytic tin test panels (10 cm×30 cm) using a #22 WWR draw-down bar and subsequently baked in an oven at 205° C. for 10 minutes. The dry film thickness of the coatings films was roughly 0.4 mil. Several coatings properties were evaluated including flexibility (ASTM D3281), adhesion (ASTM D3359), solvent resistance (D5402-15-Method A), water resistance (24 hr covered spot test; 4 hr immersion at 60° C.), and chemical resistance (24 hr covered spot test).

TABLE 6

Coatings Properties of the Cured Films from Various Formulations

| Coatings Performance | Formulation | | | |
|---|---|---|---|---|
| | 1 | 2 | 3 | 4 |
| Wedge Bend, % Failure | 36 | 52 | 50 | 44 |
| Crosshatch Adhesion (dry/wet) | 1B/0B | 0B/0B | 4B/0B | 4B/0B |
| MEK Double Rubs | 416 | 170 | 500+ | 325 |
| Water Resistance, 60° C. for 4 hours | Blushing; film lifting from edges | Blushing; film lifting from edges | Blushing; film lifting from edges | Blushing; film lifting from edges |
| Water Spot Resistance, 24 hr covered | No effect | Slight brown discoloration | No effect | No effect |

TABLE 6-continued

Coatings Properties of the Cured Films from Various Formulations

|  |  | Formulation | | | |
|---|---|---|---|---|---|
| Coatings Performance | | 1 | 2 | 3 | 4 |
| Chemical Spot Resistance, 24 hr covered | 2% Lactic Acid | No effect | Slight brown discoloration | No effect | No effect |
|  | 2% Acetic Acid | No effect | Slight brown discoloration | No effect | No effect |
|  | 2% Citric Acid | No effect | Slight brown discoloration | No effect | No effect |

Comparative Example 1: Emulsification of Hydroxyl Functional Polyester (Emul-9)

In this example, emulsifiers that are not suitable for this invention are used for the purpose of comparison. Polystep® OP-9: octylphenol ethoxylate; Polystep® TD-129: ethoxylated tridecyl alcohol; Nipol® 2782: nonyl phenol ethyleneoxide/propylene oxide block polymer; and Toximul®CA-7.5: ethoxylated coco amine.

A 500-mL kettle with a four-neck lid was equipped with a mechanical stirrer, a thermocouple, and a water feed line. The kettle was charged with PE-1 (125 g), Polystep® OP-9 (Stepan Company) (6.25 g); and Polystep® B-11 (Stepan Company) (2.12 g). The mixture was heated to a temperature of 95-99° C. under agitation once fluid. Once reaching the meltdown temperature of 95-99° C., 2-(Dimethylamino)-ethanol (DMEA) (1.57 g) was added to the mixture and then allowed to equilibrate back to 95-99° C. When target emulsification temperature was reached, room temperature deionized water (DI Water) was fed into the reaction mixture at roughly 1 mL/minute until inversion was observed. Once inversion was achieved, the water feed was temporarily suspended and then allowed to cool to less than 60° C. Once a temperature of less than 60° C. was reached, the resulting emulsion was diluted to 50% solids. After dilution to target percent solids, the resin was allowed to cool to room temperature before being collected.

Using the same method as above, Emul-10, Emul-11, and Emul-12 were made with PE-1 and alternative nonionic surfactants including: Polystep® TD129 (Stepan Company), Nipol®2782 (Stepan Company), and Toximul® CA-7.5 (Stepan Company). The relative amounts and the wet resin properties are reported in Tables 7 and 8 respectively, wherein Dv is the volume average particle diameter size; Dn is the number average particle diameter size; and PDI is the ratio expressed as Dv/Dn.

TABLE 7

Emulsified Hydroxyl Functional Polyester Resins

| | PE-1 | Polystep® OP-9 | Polystep® TD-129 | Nipol® 2782 | Toximul® CA-7.5 | Polystep® B-11 | DMEA | DI Water |
|---|---|---|---|---|---|---|---|---|
| Emul-9 | 125 | 6.25 | — | — | — | 2.12 | 1.89 | 129.74 |
| Emul-10 | 125 | — | 6.25 | — | — | 2.12 | 1.57 | 130.05 |
| Emul-11 | 125 | — | — | 6.25 | — | 2.12 | 1.57 | 130.05 |
| Emul-12 | 125 | — | — | — | 6.25 | 2.12 | 1.57 | 130.05 |

TABLE 8

Wet Resin Properties of Emulsified Hydroxyl Functional Polyesters

| Emulsion | NV, % | Visc., (cps) | pH | Acid Number, Analyzed (mgKOH/gram), on solids | Density, lb/gal | Particle Size Data | | |
|---|---|---|---|---|---|---|---|---|
| | | | | | | $D_v$, nm | $D_n$, nm | PDI |
| Emul-9 | Emulsion is unstable; agglomeration occurred | | | | | 410 | 240 | 1.7 |
| Emul-10 | Emulsion is unstable; agglomeration occurred; unable to measure particle size | | | | | | | |
| Emul-11 | Emulsion is unstable; agglomeration occurred | | | | | 891 | 458 | 1.9 |
| Emul-12 | Clear inversion point not observed; mixture very viscous; unable to measure particle size | | | | | | | |
| Emul-13 | Clear inversion point not observed; mixture very viscous; unable to measure particle size | | | | | | | |

Comparative Example 5: Emulsification of Hydroxyl Functional Polyester with 2-Butoxyethanol (Emul-13)

A 500-mL kettle with a four-neck lid was equipped with a mechanical stirrer, a thermocouple and a water feed line. The kettle was charged with PE-5 (125 g), Makon® TSP-25 (Stepan Company) (6.25 g), Eastman EB™ (6.25 g) and Polystep® B-11 (Stepan Company) (2.12 g). The mixture was heated to a temperature of 95-99° C. under agitation once fluid. When target emulsification temperature was reached, room temperature deionized water (DI Water) was fed into the reaction mixture at roughly 1 mL/minute until inversion was observed. Once inversion was achieved, the water feed was temporarily suspended and then allowed to cool to less than 60° C. Once a temperature of less than 60° C. was reached, the resulting emulsion was diluted to 50% solids. After dilution to target percent solids, the resin was allowed to cool to room temperature before being collected. The wet resin properties are included in Table 8.

The invention has been described in detail with particular reference to certain embodiments hereof, but it will be understood that variations and modifications can be effected within the scope and spirit of the invention.

We claim:

1. An aqueous polyester emulsion comprising:
   a) a curable polyester;
   b) a non-ionic emulsifier having the structure

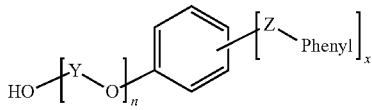

wherein each Z is independently a $C_1$ to $C_4$ hydrocarbon radical, x is an integer ranging from 1 to 5, Y is a divalent $C_1$ to $C_4$ hydrocarbon radical, and n is an integer from 1 to 100; and
   c) water.

2. The emulsion of claim 1, wherein the curable polyester is comprised of residues of:
   a) polyhydroxyl compounds comprising:
      i. diol compounds in an amount of 50 mole % to 100 mole % and
      ii. polyol compounds having 3 or more hydroxyl groups in an amount of 0 to 50 mole %,
      wherein the mole % is based on 100% of all moles of polyhydroxyl compounds a); and
   b) polycarboxyl compounds comprising:
      i. dicarboxylic acid compounds, derivatives of dicarboxylic acid compounds, the anhydrides of dicarboxylic acids, or combinations thereof; and/or
      ii. tricarboxylic acid compounds having 3 carboxylic acid groups.

3. The emulsion of claim 2, wherein the diol compounds are selected from the group consisting of 2,2,4,4-tetraalkylcyclobutane-1,3-diol (TACD), 2,2-dimethyl-1,3-propanediol (neopentyl glycol), 1,2-cyclohexanedimethanol, 1,3-cyclohexanedimethanol, 1,4-cyclohexanedimethanol, isosorbide, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, and polyethylene glycol.

4. The emulsion of claim 2, wherein the diol is selected from the group consisting of 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol.

5. The emulsion of claim 2, wherein the polyol compounds are selected from the group consisting of 1,1,1-trimethylol propane, 1,1,1-trimethylolethane, glycerin, pentaerythritol, erythritol, threitol, dipentaerythritol, and sorbitol, and mixtures thereof.

6. The emulsion of claim 2, wherein the polycarboxylic acid compounds are selected from the group consisting of isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, hexahydrophthalic anhydride, tetrahydrophthalic anhydride, tetrachlorophthalic anhydride, dodecanedioic acid, sebacic acid, azelaic acid, succinic anhydride, succinic acid, adipic acid, 2,6-naphthalenedicarboxylic acid, glutaric acid, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

7. The emulsion of claim 1, wherein the curable polyester has a hydroxyl number of from 30 to 200 mg KOH/g; and an acid number of less than 50.

8. The emulsion of claim 1, wherein the curable polyester has a glass transition temperature (Tg) of from 40° C. to 120° C., as measured by ASTM D3418.

9. A thermosetting coating composition comprising:
   a) an aqueous polyester emulsion comprising:
      i. a curable polyester;
      ii. a non-ionic emulsifier having the structure;

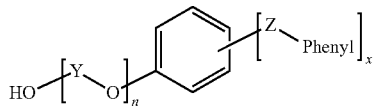

wherein each Z is independently a $C_1$ to $C_4$ hydrocarbon radical, x is an integer ranging from 1 to 5, Y is a divalent $C_1$ to $C_4$ hydrocarbon radical, and n is an integer from 1 to 100, and
      iii. water; and
   b) a cross-linker.

10. The thermosetting coating composition of claim 9, wherein the cross-linker is selected from the group consisting of amino resins, isocyanates, and phenolic resins.

11. The thermosetting coating composition of claim 9, wherein the curable polyester is comprised of residues of:
   a) polyhydroxyl compounds comprising:
      i. diol compounds in an amount of 50 mole % to 100 mole % and ii. polyol compounds having 3 or more hydroxyl groups in an amount of 0 to 50 mole %,
wherein the mole % is based on 100% of all moles of polyhydroxyl compounds a); and
b) polycarboxyl compounds comprising:
i. dicarboxylic acid compounds, derivatives of dicarboxylic acid compounds, the anhydrides of dicarboxylic acids, or combinations thereof; and/or
ii. tricarboxylic acid compounds having 3 carboxylic acid groups.

12. The thermosetting coating composition of claim 11, wherein the diol compounds are selected from the group consisting of 2,2,4,4-tetraalkylcyclobutane-1,3-diol (TACD), 2,2-dimethyl-1,3-propanediol (neopentyl glycol), 1,2-cyclohexanedimethanol, 1,3-cyclohexanedimethanol, 1,4-cyclohexanedimethanol, isosorbide, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, and polyethylene glycol.

13. The thermosetting coating composition of claim 11, wherein the diol is selected from the group consisting of 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol.

14. The thermosetting coating composition of claim 9, wherein the polyol compounds are selected from the group consisting of 1,1,1-trimethylol propane, 1,1,1-trimethylolethane, glycerin, pentaerythritol, erythritol, threitol, dipentaerythritol, and sorbitol, and mixtures thereof.

15. The thermosetting coating composition of claim 9, wherein the polycarboxylic acid compounds are selected from the group consisting of isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, hexahydrophthalic anhydride, tetrahydrophthalic anhydride, tetrachlorophthalic anhydride, dodecanedioic acid, sebacic acid, azelaic acid, succinic anhydride, succinic acid, adipic acid, 2,6-naphthalenedicarboxylic acid, glutaric acid, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyldibenzoic acid, and mixtures thereof.

16. The thermosetting coating composition of claim 9, wherein the curable polyester has a hydroxyl number of from 30 to 200 mg KOH/g; and an acid number of less than 50.

17. The thermosetting coating composition of claim 9, wherein the curable polyester has a glass transition temperature (Tg) of from 40° C. to 120° C., as measured by ASTM D3418.

18. The thermosetting coating composition of claim 9, further comprising one or more co-resins.

19. A shaped or formed article coated with a cured thermosetting coating composition comprising:
a) an aqueous polyester emulsion comprising:
i. a curable polyester;
ii. a non-ionic emulsifier having the structure of

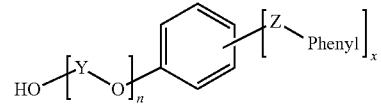

wherein each Z is independently a divalent $C_1$ to $C_4$ hydrocarbon radical, x is the number of said substituent(s) ranging from 1 to 5, Y is $C_1$ to $C_4$ hydrocarbon radical, and n is an integer from 1 to 100, and
iii. water; and
b) a cross-linker.

* * * * *